US012247697B2

(12) United States Patent
Sorg

(10) Patent No.: US 12,247,697 B2
(45) Date of Patent: Mar. 11, 2025

(54) FLEXIBLE FLUID RESERVOIR SYSTEM

(71) Applicant: Appalachia Design, Cardington, OH (US)

(72) Inventor: Daniel Sorg, Elizabethton, TN (US)

(73) Assignee: Appalachia Design, Cardington, OH (US)

( * ) Notice: Subject to any disclaimer, the term of this patent is extended or adjusted under 35 U.S.C. 154(b) by 55 days.

(21) Appl. No.: 18/187,819

(22) Filed: Mar. 22, 2023

(65) Prior Publication Data

US 2024/0318778 A1    Sep. 26, 2024

(51) Int. Cl.
*F16N 37/02*    (2006.01)
*F16N 3/12*    (2006.01)

(52) U.S. Cl.
CPC ............. *F16N 37/02* (2013.01); *F16N 3/12* (2013.01)

(58) Field of Classification Search
CPC ... F16N 3/08; F16N 3/12; F16N 19/00; F16N 37/02; F16N 2200/12
USPC ..... 206/384; 222/95, 105; 184/105.1, 105.2, 184/105.3
See application file for complete search history.

(56) References Cited

U.S. PATENT DOCUMENTS

| | | | | |
|---|---|---|---|---|
| 2,031,495 A * | 2/1936 | Macklanburg | .......... | F16N 37/02 206/384 |
| 2,317,270 A * | 4/1943 | Harris | ....................... | F16N 3/12 222/105 |
| 4,909,416 A * | 3/1990 | Evezich | .................... | B65D 1/32 222/105 |
| 5,044,471 A * | 9/1991 | Machek | .................... | F16N 3/12 222/326 |
| 5,199,614 A * | 4/1993 | Husman | .................. | B05B 11/02 242/379.2 |
| 5,312,018 A * | 5/1994 | Evezich | ............. | B65D 83/0055 222/105 |
| 9,874,310 B2 * | 1/2018 | Sorg | .................. | B05C 17/00596 |
| 10,711,944 B2 * | 7/2020 | Sorg | ......................... | F16N 3/12 |
| 2024/0238836 A1 * | 7/2024 | Sorg | ........................ | B05C 17/01 |

* cited by examiner

Primary Examiner — Bryon P Gehman
(74) Attorney, Agent, or Firm — Briggs Intellectual Property Law; Jeremy A. Briggs

(57) ABSTRACT

A fluid reservoir configured to attach to a pump head is disclosed. The fluid reservoir may include an attachment configured to engage with a pump head socket. The attachment may include threads at an attachment outer surface portion. The fluid reservoir may further include a fluid reservoir outer body and a fluid reservoir inner body. The fluid reservoir outer body may have an interior surface and an exterior surface, and the fluid reservoir inner body may be disposed at the interior surface. The fluid reservoir inner body may be configured to store fluid. The fluid reservoir outer body and the fluid reservoir inner body may form a single piece fluid reservoir. The fluid reservoir inner body may be configured to expand longitudinally when the fluid is filled in the fluid reservoir inner body and collapse longitudinally when the fluid is dispensed from the fluid reservoir inner body.

16 Claims, 11 Drawing Sheets

FLEXIBLE FLUID RESERVOIR SYSTEM

TECHNICAL FIELD

The present disclosure relates to a fluid reservoir, and more specifically to a flexible fluid reservoir that may be configured to collapse longitudinally when fluid is dispensed from the fluid reservoir.

BACKGROUND

Machine operators use grease guns to apply grease to machine components, such as bearings, joints, shafts, and/or the like. Grease guns are generally configured to operate with disposable pre-filled grease cartridges that may be placed inside grease gun containers/housing. An operator may unload an empty grease cartridge from a grease gun housing and load a new pre-filled full grease cartridge when the cartridge runs out of grease. Loading/unloading a conventional grease cartridge to/from the housing may cause inconvenience to the operator. For example, the operator may be required to use a plunger to pull the cartridge out from the housing when the cartridge is being replaced. Further, loading/unloading a conventional grease cartridge to/from the housing may result in grease spillage.

Furthermore, conventional grease gun housings have opaque walls. Therefore, the operator may find it difficult to determine an amount of grease dispensed or left in the cartridge when the grease gun may be used. In addition, due to opaque housing, the operator may not be able view useful information that may be printed on cartridge walls. For example, the operator may not be able to view information associated with grease expiry date that may be printed on the cartridge walls, grease type, amount of grease used for a specific task, etc.

Conventional grease gun cartridges may also be susceptive to leakage, which may result in grease spillage. Grease spillage may cause inconvenience to the operator, as the operator may have to clean the area (e.g., floor) on which the grease may be spilled. Grease spillage may also result in grease wastage, and hence the operator may have to replace the cartridges more frequently.

Thus, there is a need for a fluid reservoir that may overcome structural challenges associated with a conventional grease gun cartridge, and prevent grease spillage.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1A:
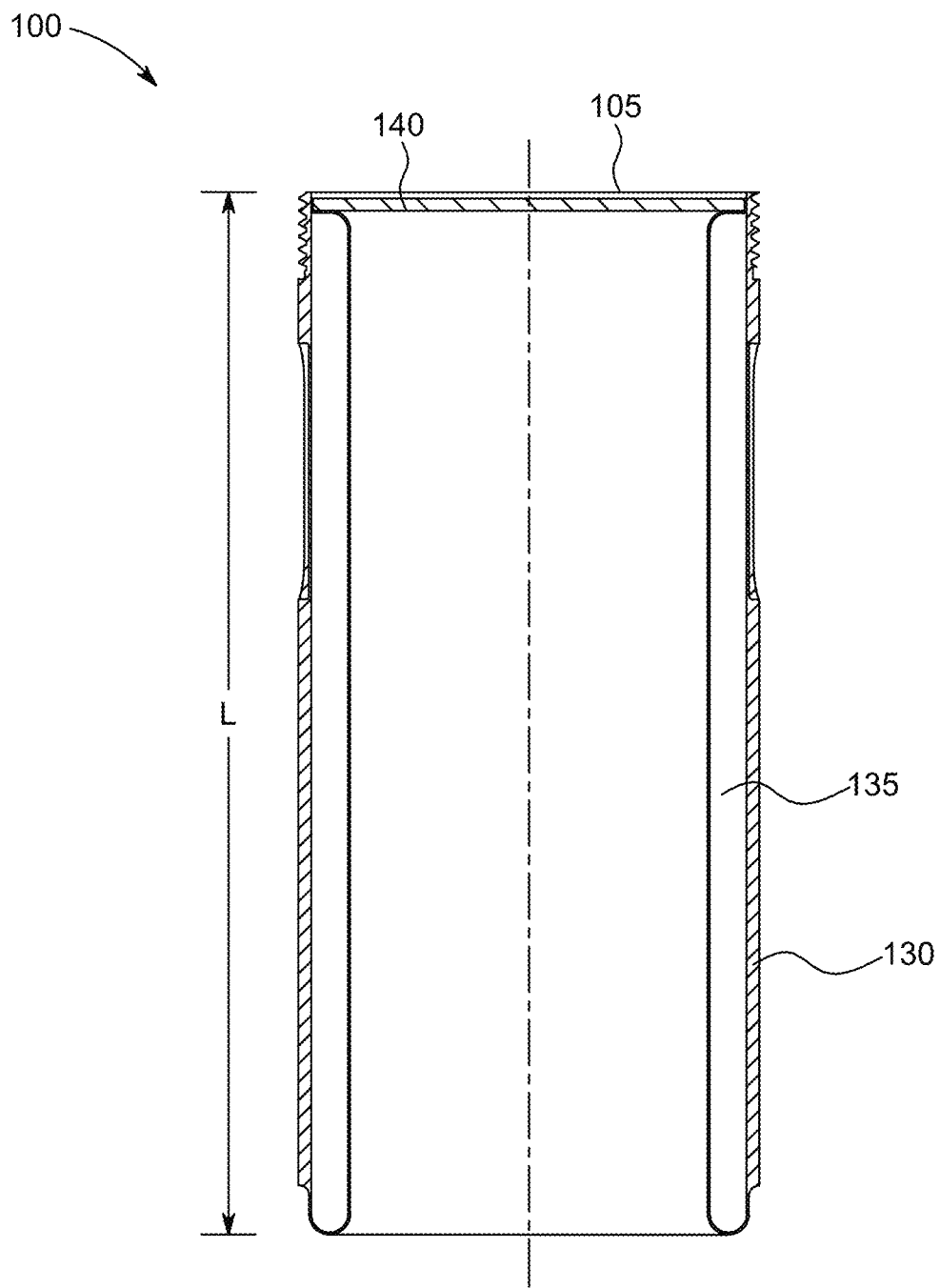
FIG. 1A depicts a sectional view (section A-A) of an example fluid reservoir when the fluid reservoir may be empty, in accordance with the present disclosure.

The present disclosure is directed towards a fluid reservoir that may include a fluid reservoir outer body and a fluid reservoir inner body, which may form a unified fluid reservoir structure. The fluid reservoir outer body may be a cylindrical rigid body having an interior surface and an exterior surface. The fluid reservoir inner body may include a flexible wall and a rigid closed end and may be configured to store fluid. The flexible wall may be disposed at the interior surface of the fluid reservoir outer body. The flexible wall may be configured to expand longitudinally when the fluid (e.g., grease) may be filled in the fluid reservoir inner body and collapse longitudinally when the fluid may be dispensed from the fluid reservoir inner body. The closed end may be configured to slide up or down within the fluid reservoir inner body along a fluid reservoir inner body length (e.g., over the flexible wall) when the fluid may be dispensed from or filled in the fluid reservoir inner body.

In some aspects, the flexible wall may fold onto itself when the closed end slides up (e.g., when the fluid may be dispensed from the fluid reservoir) and may unfold when the closed end slides down (e.g., when the fluid may be filled in the fluid reservoir). As an example, the closed end may be disposed in proximity to a fluid reservoir top end and the flexible wall may completely fold onto itself when the fluid reservoir may be empty. In a similar manner, the closed end may be disposed in proximity to a fluid reservoir bottom end and the flexible wall may be in completely unfold state when the fluid reservoir may be fully filled.

In some aspects, a fluid reservoir inner body length may be twice a fluid reservoir outer body length "L". Thus, the flexible wall may expand up to a length "2L", when fluid may completely fill the fluid reservoir inner body. In other aspects, the fluid reservoir inner body length may be equivalent to the fluid reservoir outer body length such that the flexible wall may remain enclosed within the fluid reservoir outer body when the flexible wall completely unfolds (e.g., when the fluid reservoir may be fully filled).

The fluid reservoir may further include threads, or other attachment means disposed in proximity to the fluid reservoir top end, and may be disposed at an exterior surface of the fluid reservoir outer body. The attachment means may be configured to attach the fluid reservoir with a pump head (e.g., a grease gun head). In addition, the fluid reservoir outer body may be made of transparent or translucent plastic.

The present disclosure discloses a fluid reservoir that may efficiently dispense grease without any wastage/spillage (e.g., by collapsing longitudinally from the fluid reservoir bottom end to the fluid reservoir top end, and by sealing the fluid reservoir inner body using the closed end). In addition, a user may conveniently attach the fluid reservoir to the grease gun head by using the threaded attachment. Furthermore, since the fluid reservoir outer body is made of transparent or translucent material, the fluid reservoir may enable the user to easily view an amount of grease dispensed from the fluid reservoir or an amount of grease left in the fluid reservoir. The user may also determine or get an indication of the amount of grease left in the fluid reservoir or dispensed from the fluid reservoir based on the fluid reservoir inner body length.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1B:
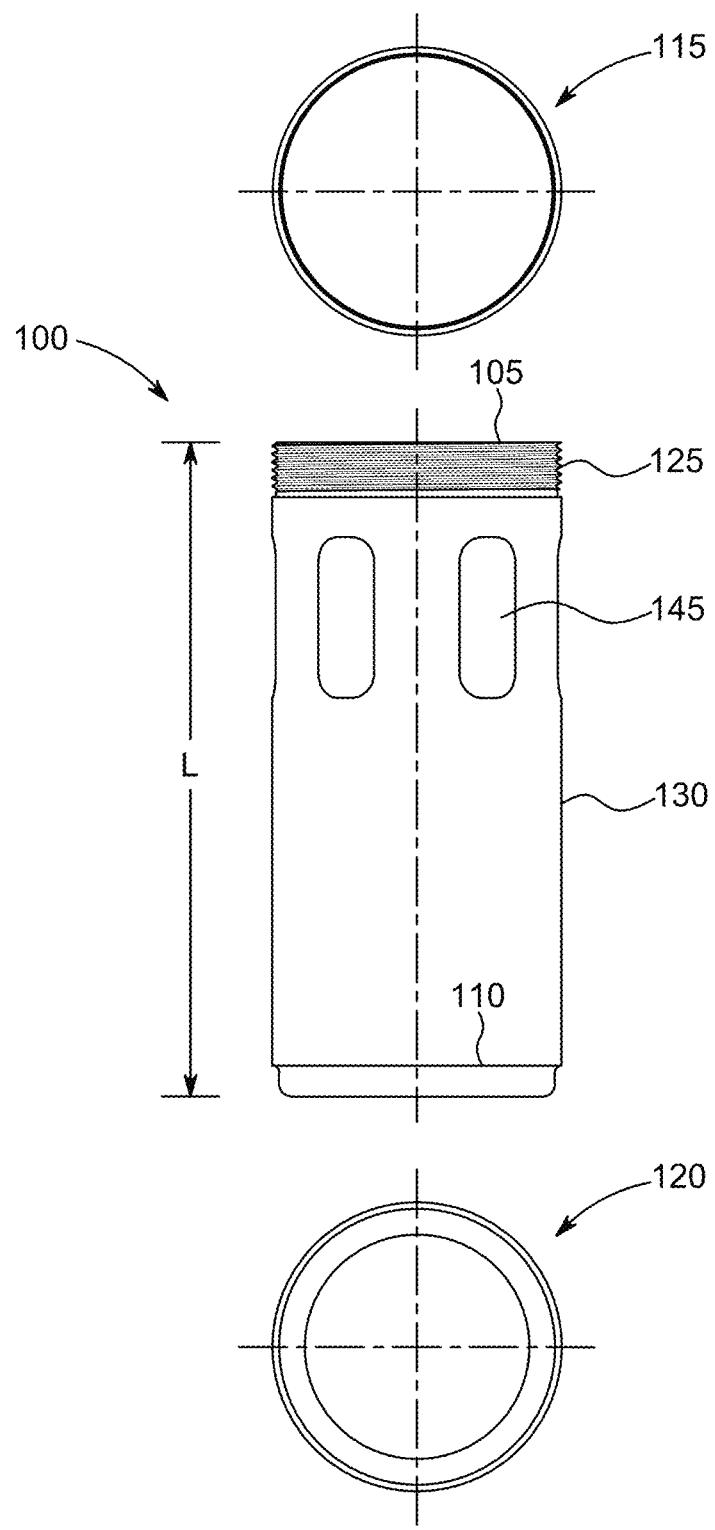
FIG. 1B depicts an exterior view of the fluid reservoir of FIG. 1A in accordance with the present disclosure.
Figure 2A:
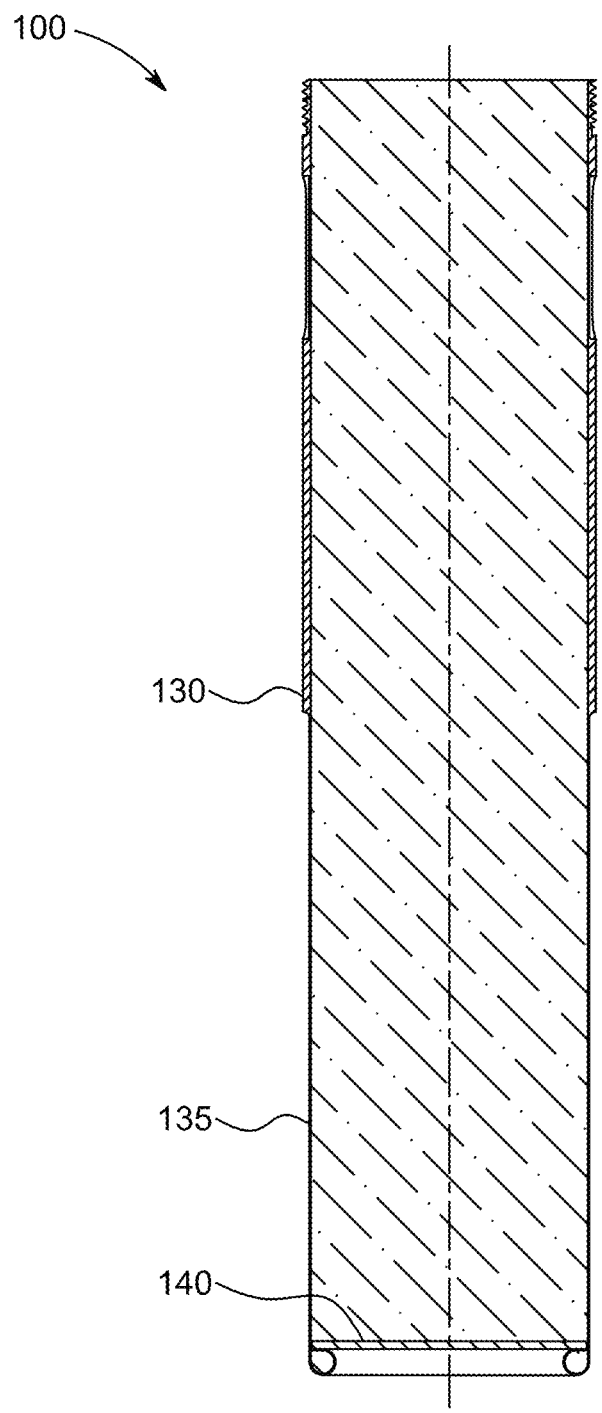
FIG. 2A depicts a sectional view (section A-A) of the fluid reservoir of FIG. 1A when the fluid reservoir may be filled with fluid, in accordance with the present disclosure.
Figure 2B:
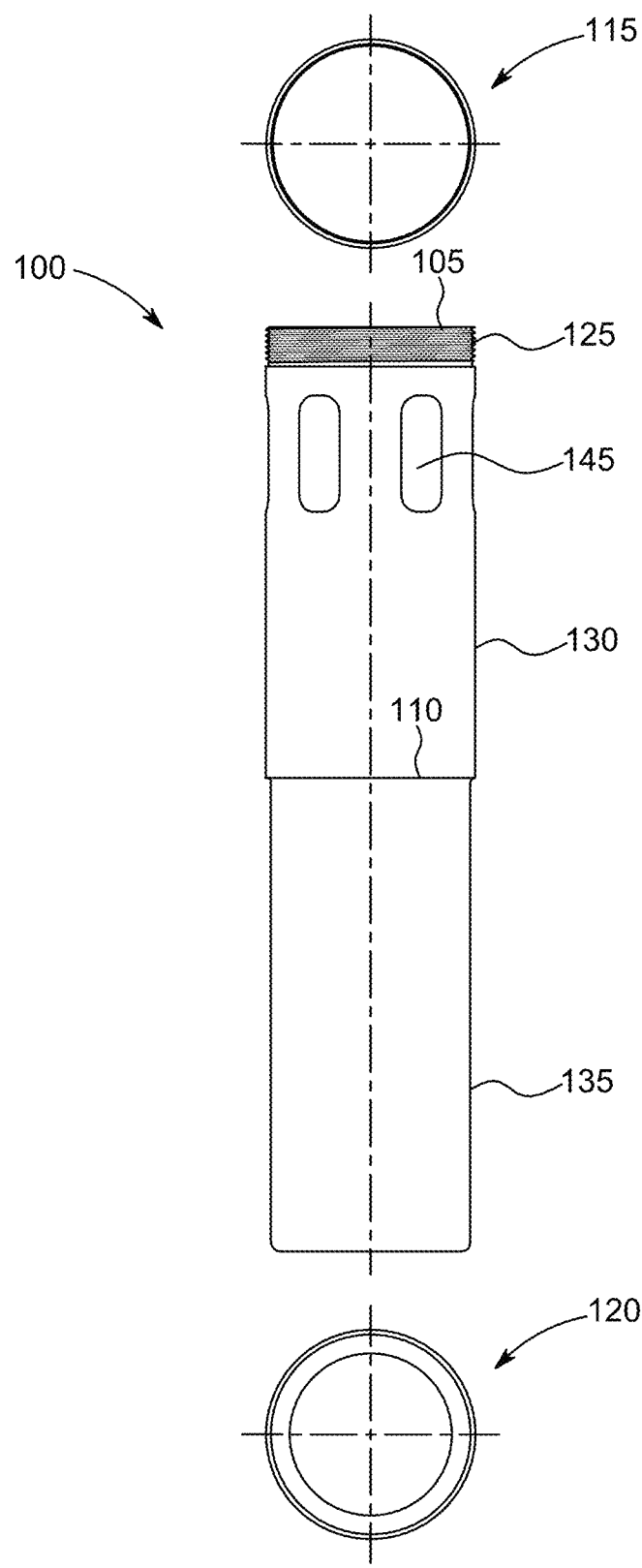
FIG. 2B depicts an exterior view of the fluid reservoir of FIG. 2A in accordance with the present disclosure.
Figure 3:
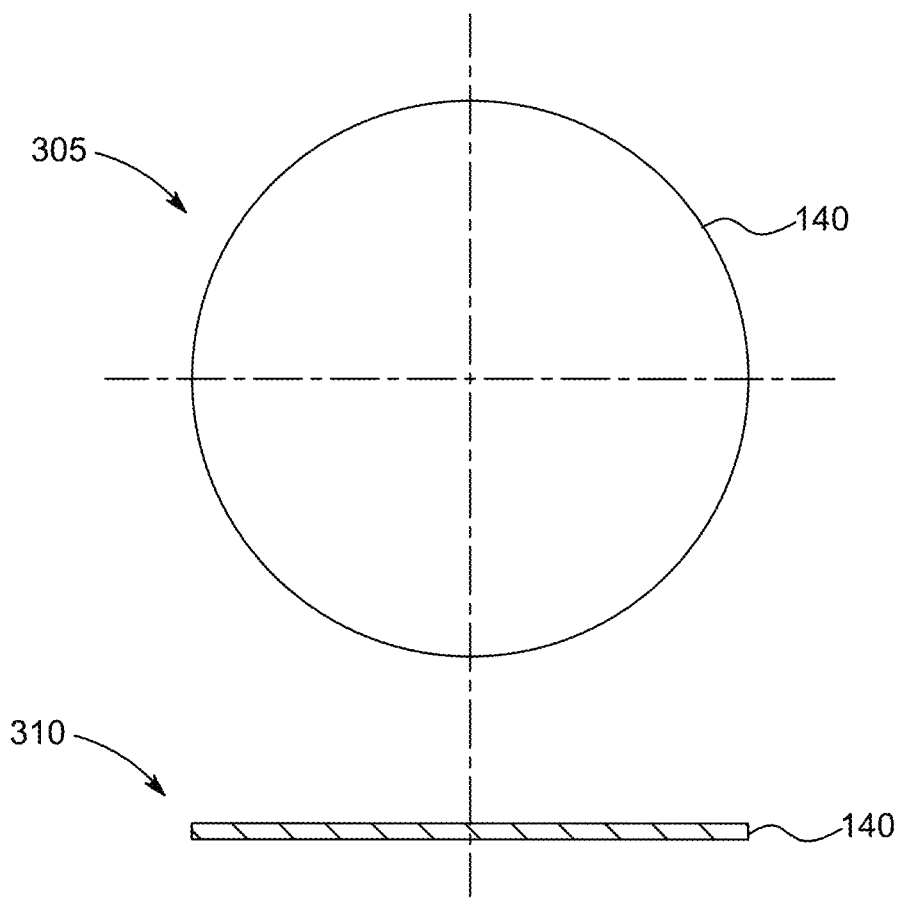
FIG. 3 depicts an example fluid reservoir rigid closed end in accordance with the present disclosure.

FIG. 1A depicts a sectional view (section A-A) of an example fluid reservoir 100 when the fluid reservoir 100 may be empty, in accordance with the present disclosure. While describing FIG. 1A, references may be made to FIGS. 1B, 2A, 2B and 3. FIG. 1B depicts an exterior view of the fluid reservoir 100 when the fluid reservoir 100 may be empty. FIG. 2A depicts a sectional view (section A-A) of the fluid reservoir 100 when the fluid reservoir 100 may be filled with fluid, and FIG. 2B depicts an exterior view of the fluid reservoir 100 when the fluid reservoir 100 may be filled with fluid. FIG. 3 depicts an example fluid reservoir rigid closed end in accordance with the present disclosure.

The fluid reservoir 100 may be configured to store fluid such as grease or other solid/semi-solid lubricants, and may be configured to be attached to a conventional grease gun (not shown). The grease may be a multipurpose grease, an automotive grease, an industrial grease, a marine grease, and/or the like.

The fluid reservoir 100 may be a cylindrical hollow tube that may be filled with grease (or any other fluid). A fluid reservoir 100 diameter may vary based on required reservoir usage. In an exemplary aspect, the fluid reservoir 100 diameter may be in a range of 30 to 70 millimeters. It should be appreciated that other diameters are possible and the listed range should not be considered comprehensive or limiting.

The fluid reservoir 100 may include a fluid reservoir proximal end 105 and a fluid reservoir distal end 110. A fluid reservoir 100 top view is shown as view 115, and a fluid reservoir 100 bottom view is shown as view 120 in FIG. 1B.

The fluid reservoir 100 may further include an attachment at the fluid reservoir proximal end 105 (e.g., at a fluid reservoir proximal end 105 outer surface), which may be configured to engage the fluid reservoir 100 with a grease gun head (or any other pump head, not shown). The attachment may include threads 125 at an attachment outer surface portion, which may engage with the grease gun head. Specifically, the grease gun head may include a grease gun socket that may have threads at a socket inner surface. The threads 125 (or threaded attachment 125, disposed at the fluid reservoir proximal end 105 outer surface) may engage with the threads (disposed at the socket inner surface) to securely attach the fluid reservoir 100 to the grease gun pump head.

In some aspects, the fluid reservoir 100 may be configured to removably attach with different types of manually operated or power-assist grease guns via the threaded attachment 125. For example, the fluid reservoir 100 may attach with a lever grease gun or a pistol-grip grease gun via the threaded attachment 125. In either case, the grease gun may include a lever that may couple with the grease gun pump head. The manually operated lever may allow a user to hand-pump the grease from the fluid reservoir 100 to a grease gun hose (not shown). Stated another way, the lever-operated pump may provide negative pressure to enable the grease to move out from the fluid reservoir 100. Specifically, when the user hand-pumps the lever, the grease gun pump head may generate a negative pressure inside the fluid reservoir 100 (e.g., in a fluid reservoir interior side). Negative pressure generation may enable the grease to move out from the fluid reservoir 100, towards the grease gun hose. In a similar manner, in the case of a power-operated (e.g., electric or pneumatic) grease gun, the grease gun pump head may generate negative pressure inside the fluid reservoir 100 when the user pulls the grease gun pistol trigger.

In some aspects, the user may conveniently disengage the fluid reservoir 100 from the grease gun head when the fluid reservoir 100 runs out of grease (e.g., when the user uses the grease stored in the fluid reservoir 100), or when it is desirable to dispense a different type of grease. The user may easily engage/disengage the fluid reservoir 100 to/from the grease gun, and may easily re-fill or replace the fluid reservoir 100.

As shown in FIG. 1A, the fluid reservoir 100 may further include a fluid reservoir outer rigid tube body 130 (or fluid reservoir outer body 130), and a fluid reservoir inner flexible tube body 135 (or fluid reservoir inner body 135) disposed inside the fluid reservoir outer rigid tube body 130. The fluid reservoir inner flexible tube body 135 may be configured to store fluid (e.g., grease). In an exemplary aspect, the fluid reservoir outer rigid tube body 130 may have a length "L" that may depend on fluid reservoir 100 usage. For example, the fluid reservoir outer rigid tube body 130 may have a longer length "L" when the fluid reservoir 100 is expected to store a higher volume of grease, and/or when the fluid reservoir 100, shown as fluid reservoir 600 in FIGS. 6A-6D, is to be used as a second (or opposite) lever when using a lever grease gun.

In some aspects, the fluid reservoir outer body 130 may be a rigid body, and the fluid reservoir inner body 135 may be a flexible thin body. A fluid reservoir outer body 130 thickness (e.g., wall thickness of fluid reservoir outer body 130) may be greater than a fluid reservoir inner body 135 thickness (e.g., wall thickness of fluid reservoir inner body 135). The fluid reservoir outer body 130 and the fluid reservoir inner body 135 may be molded to form a single unified piece or single piece fluid reservoir and may be made of plastic. In an exemplary aspect, the fluid reservoir outer body 130 and the fluid reservoir inner body 135 may form a single unified piece by injection molding and/or blow molding process. In additional aspects, the fluid reservoir outer body 130, the fluid reservoir inner body 135, and the attachment at the fluid reservoir proximal end 105 may be molded to form the single piece fluid reservoir.

The fluid reservoir outer body 130 may include a cylindrical wall having an interior surface and an exterior surface, and an open bottom end (towards the fluid reservoir distal end 110). The fluid reservoir inner body 135 may be disposed at the interior surface of the fluid reservoir outer body 130. Stated another way, the fluid reservoir inner body 135 may fit inside a fluid reservoir outer body 130 wall. The attachment disposed at the fluid reservoir proximal end 105 may be located at the exterior surface of the fluid reservoir outer body 130. Specifically, the threaded attachment 125 may be disposed at the exterior surface of the fluid reservoir outer body 130.

The fluid reservoir inner body 135 may include a closed end 140 and a flexible sidewall. The closed end 140 and the flexible sidewall may be molded to form a single unified piece. In some aspects, the flexible sidewall may have a length twice the fluid reservoir outer body 130 length "L" (i.e., the flexible sidewall may have length "2L"). In other aspects, the flexible sidewall may have any other length. Further, the closed end 140 may be a rigid end.

A closed end 140 thickness may be greater than a flexible sidewall thickness. In some aspects, the closed end 140 thickness may be equivalent to a fluid reservoir outer body 130 wall thickness. The closed end 140 may have a circular cross section, as shown in FIG. 3. Specifically, FIG. 3 depicts a view 305 that illustrates the circular cross section of the closed end 140. Corresponding section A-A of the closed end 140 is depicted as view 310 in FIG. 3.

In some aspects, the closed end 140 may tightly fit inside the fluid reservoir inner body 135, and may be configured to slide up or down within the fluid reservoir inner body 135 along a fluid reservoir inner body 135 length (e.g., over the flexible sidewall) when the grease may be dispensed from or filled in the fluid reservoir inner body 135. When the closed end 140 slides up, the closed end 140 may move from a fluid reservoir bottom position to a fluid reservoir top position and push the grease upwards such that no grease may be left below the closed end 140. In this manner, the closed end 140 may prevent grease leakage or wastage.

As described above, the fluid reservoir inner body 135 may be a hollow cylindrical body configured to receive and store grease (or any other fluid). The fluid reservoir inner body 135 (e.g., the flexible sidewall) may be configured to expand or collapse longitudinally (and not laterally) when the grease may be filled in or dispensed from the fluid reservoir inner body 135. Stated another way, the closed end 140 of the fluid reservoir inner body 135 may slide up and down along the fluid reservoir inner body 135 length and over the flexible sidewall when the grease may be dispensed from or filled in the fluid reservoir inner body 135. In some aspects, the flexible sidewall may fold onto itself (e.g., a first flexible sidewall layer may fold lengthwise over a second flexible sidewall layer, where the first flexible sidewall layer and the second flexible sidewall layer may be integrated layers) when the closed end 140 slides up the fluid reservoir inner body 135 length (e.g., when the grease may be dispensed from the fluid reservoir inner body 135). Further, the flexible sidewall may expand (i.e., unfold from its folded state) when the closed end 140 may slide down the fluid reservoir inner body 135 length (e.g., when the grease may be filled in the fluid reservoir inner body 135). In some aspects, the fluid reservoir inner body 135/the flexible sidewall may be configured to expand up to twice the fluid reservoir outer body 130 length (e.g., the flexible sidewall may expand up to length "2L"), when the grease may completely fill the fluid reservoir inner body 135.

In some aspects, the fluid reservoir outer body 130 may not expand or contract/collapse when the fluid reservoir inner body 135/the flexible sidewall expands or collapses. Stated another way, the fluid reservoir outer body 130 may remain stationary when the closed end 140 moves up or down along the fluid reservoir inner body 135 length. Closed end 140 movement is described in detail below.

In an exemplary aspect shown in FIG. 1A, a fluid reservoir inner body 135 length may be equivalent to the fluid reservoir outer body 130 length "L" when the fluid reservoir 100 may be empty. Stated another way, the flexible sidewall may completely fold onto itself when the fluid reservoir inner body 135 may be empty and the closed end 140 may be positioned completely upwards in proximity to the fluid reservoir proximal end 105. In this case, the fluid reservoir inner body 135 (e.g., the flexible sidewall) may be completely enclosed within the fluid reservoir outer body 130 (e.g., within the fluid reservoir outer body 130 wall) when the fluid reservoir 100/fluid reservoir inner body 135 may be empty.

Since the closed end 140 tightly fits inside the fluid reservoir inner body 135 (e.g., a closed end 140 diameter may be equivalent to a fluid reservoir inner body diameter), the closed end 140 may seal the fluid reservoir proximal end 105 when the fluid reservoir inner body 135 may be empty. When the grease may be filled inside the fluid reservoir 100 (i.e., inside the fluid reservoir inner body 135), the closed end 140 may slide downwards due to grease volume (e.g., the closed end 140 may slide downwards from the fluid reservoir proximal end 105 towards the fluid reservoir distal end 110). Downward closed end 140 movement may cause the flexible sidewall to unfold and "expand" longitudinally along the fluid reservoir inner body 135 length. The closed end 140 may move in proximity to the fluid reservoir distal end 110 as the grease may be filled in the fluid reservoir 100 (i.e., inside the fluid reservoir inner body 135). Specifically, the closed end 140 may be positioned in proximity to the fluid reservoir distal end 110 when the fluid reservoir 100 may be half-filled.

The fluid reservoir inner body 135 may expand beyond the fluid reservoir outer body 130 length "L" (i.e., beyond the fluid reservoir distal end 110) when more grease may be filled inside the fluid reservoir inner body 135. The fluid reservoir inner body 135 may continue to expand as more grease may be filled, until the fluid reservoir inner body 135 expands to twice the fluid reservoir outer body 130 length "L". The fluid reservoir inner body 135 may be completely filled with grease (i.e., the fluid reservoir 100 may be 100% filled) when the fluid reservoir inner body 135 expands to twice the fluid reservoir outer body 130 length "L". In this state, the flexible sidewall may be completely unfolded such that a flexible sidewall length may be "2L". A sectional view of the fluid reservoir 100 when the fluid reservoir inner body 135 may be completely filled with grease is shown in FIG. 2A. An exterior view of the fluid reservoir 100 when the fluid reservoir inner body 135 may be completely filled with grease is shown in FIG. 2B. As shown in FIG. 2A, the closed end 140 may completely move downwards when the fluid reservoir inner body 135 may be filled with grease.

In operation, a user may attach a completely-filled fluid reservoir 100 (e.g., as shown in FIGS. 2A and 2B) to a grease gun by using the threaded attachment 125, or other attachment means. In some aspects, the fluid reservoir 100 may further include indentations 145 that may enable the user to conveniently hold the fluid reservoir 100 when the user attaches the fluid reservoir to the grease gun. To dispense grease from the fluid reservoir 100 (i.e., from the fluid reservoir inner body 135), the user may generate negative pressure inside the fluid reservoir inner body 135 by operating the grease gun lever (if the grease gun is a lever grease gun) or the grease gun pistol (if the grease gun is a pistol-grip grease gun).

Negative pressure generation may cause the closed end 140 to slide upwards along the fluid reservoir inner body 135 length towards the fluid reservoir proximal end 105, and the grease to dispense from the fluid reservoir proximal end 105. As the closed end 140 slides upwards, the fluid reservoir inner body 135 may collapse longitudinally. Stated another way, as the closed end 140 slides upwards, the flexible sidewall may fold onto itself and may thus enable closed end 140 upward movement.

When the operator dispenses 50% grease from the fluid reservoir 100, the closed end 140 may be located in proximity to the fluid reservoir distal end 110, and a flexible sidewall length may be "1.5L". The closed end 140 may continue to move upwards when more grease may be dispensed from the fluid reservoir inner body 135, until the closed end 140 reaches in proximity to the fluid reservoir proximal end 105 (e.g., when the grease is completely dispensed from the fluid reservoir 100). In this state, the flexible sidewall may are completely folded onto itself, and may hence have the flexible sidewall length as "L", as shown in FIG. 1A. The user may then re-fill the fluid reservoir 100 with fresh grease, or may replace the fluid reservoir 100 in the grease gun with a new fluid reservoir. As discussed above, the fluid reservoir inner body 135 may expand when the user re-fills the fluid reservoir 100, in the manner described above.

In some aspects, the fluid reservoir inner body 135 and the fluid reservoir outer body 130 may be made of transparent or translucent material (e.g., plastic), which may enable the user to easily view an amount of grease dispensed from the fluid reservoir 100 or an amount of grease left in the fluid reservoir 100. The user may also determine or get an indication of the amount of grease left in the fluid reservoir 100 or dispensed from the fluid reservoir 100 based on the flexible sidewall length (or the fluid reservoir inner body 135 length). For example, if the flexible sidewall length is "1.5L", the user may determine that the fluid reservoir 100 may be 50% filled. In this manner, the user may track the flexible sidewall length to determine an optimum time to replace the fluid reservoir 100. Transparent or translucent fluid reservoir inner and outer bodies 135, 130 may further enable the user to easily view useful information (e.g., grease expiry date, grease type, etc.) that may be printed on the fluid reservoir inner body 135.

Figure 4:
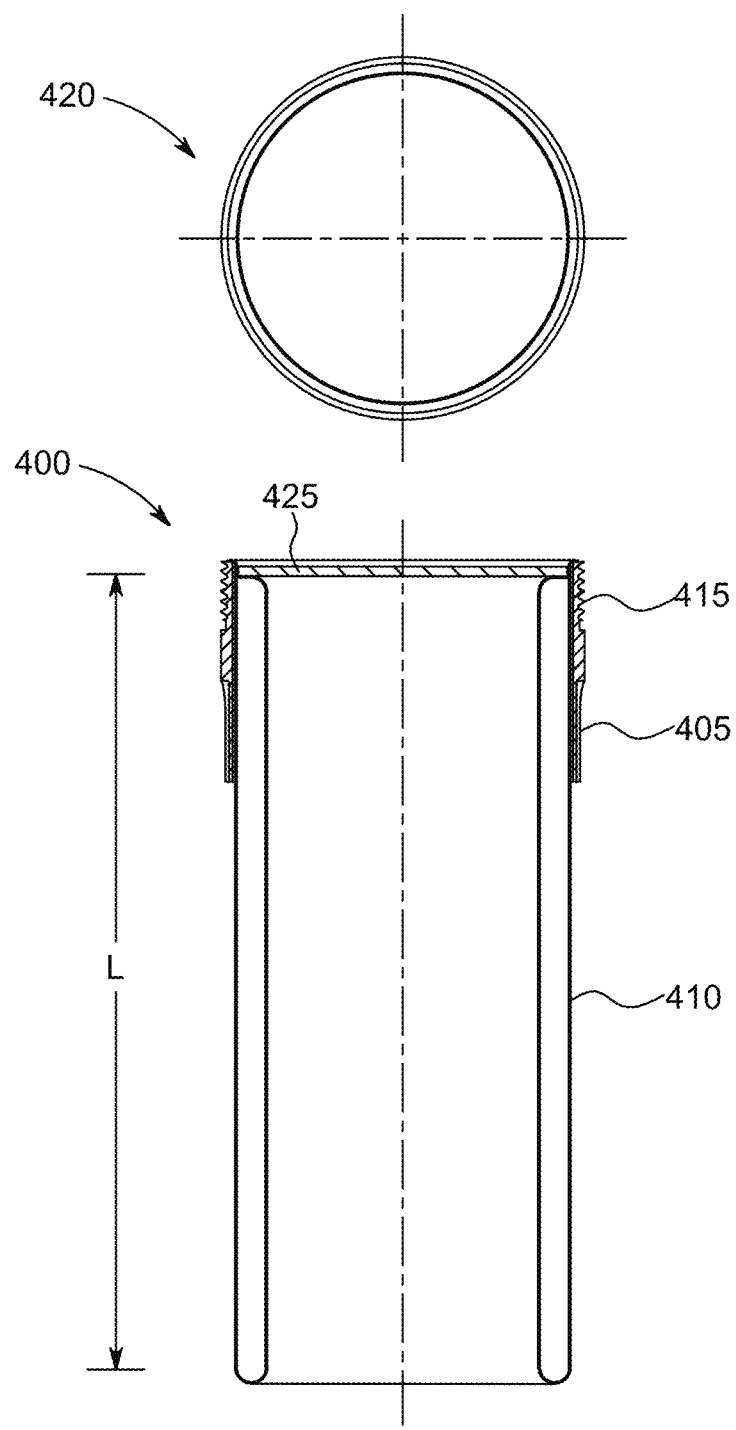
FIG. 4 depicts a sectional view (section A-A) of another example fluid reservoir when the fluid reservoir may be empty, in accordance with the present disclosure.
Figure 5:
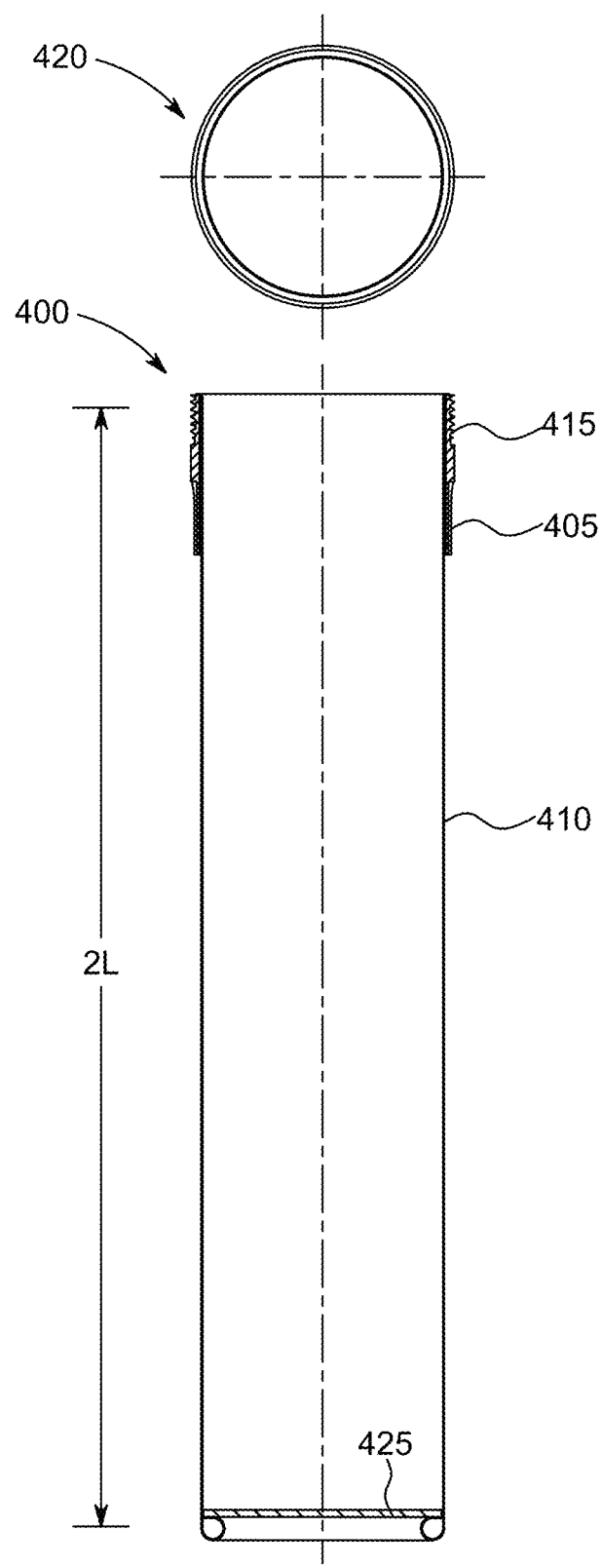
FIG. 5 depicts a sectional view (section A-A) of the fluid reservoir of FIG. 4 when the fluid reservoir may be filled with fluid, in accordance with the present disclosure.

FIG. 4 depicts a sectional view (section A-A) of another example fluid reservoir 400 when the fluid reservoir 400 may be empty, in accordance with the present disclosure. While describing FIG. 4, references may be made to FIG. 5. In particular, FIG. 5 depicts a sectional view (section A-A) of the fluid reservoir 400 when the fluid reservoir 400 may be filled with fluid, in accordance with the present disclosure.

The fluid reservoir 400 may include a fluid reservoir outer body 405 (e.g., a "shortened" fluid reservoir outer body 130), a fluid reservoir inner body 410, and an attachment/threads 415 at fluid reservoir outer body 405 exterior surface (e.g., disposed in proximity to a fluid reservoir 400 top portion). A fluid reservoir 400 top view is shown as view 420 in FIGS. 4 and 5. Fluid reservoir 400 dimensions (e.g., diameter) and shape may be same as fluid reservoir 100 dimensions and shape. Further, the fluid reservoir 400 may be made of same material as the fluid reservoir 100.

The fluid reservoir inner body 410 may be similar to the fluid reservoir inner body 135. Specifically, the fluid reservoir inner body 410 may include a flexible sidewall and a closed end 425. The flexible sidewall may be same as the flexible sidewall described in conjunction with FIGS. 1-2, and the closed end 425 may be same as the closed end 140. In some aspects, the closed end 425 may be a rigid end. The fluid reservoir inner body 410 may be configured to expand or contract longitudinally when the grease may be filled in or dispensed from the fluid reservoir 400, in a manner described above.

The fluid reservoir inner body 410 may have a length "2L", and may fold onto itself to have an effective length "L" when the fluid reservoir 400 may be empty. In this case, the closed end 425 may be positioned towards the fluid reservoir top portion (e.g., in proximity to the threads 415). The fluid reservoir inner body 410 may expand/unfold up to the length "2L" when the grease may be filled inside the fluid reservoir 400, as shown in FIG. 5. In this case, the closed end 425 may be positioned towards the fluid reservoir 400 bottom portion (i.e., opposite to the fluid reservoir 400 top portion).

The fluid reservoir outer body 405 may be same as the fluid reservoir outer body 130, however, a fluid reservoir outer body 405 length may be shorter than the fluid reservoir outer body 130 length (e.g., the fluid reservoir outer body 405 length may be in range of "0.10L"-"0.25L"). The shorter length of the fluid reservoir outer body 405 may save resources (e.g., plastic). Since the fluid reservoir outer body 405 is shorter, the indentations (e.g., indentations 145) may not be present in the fluid reservoir 400). The fluid reservoir 400 may work with pistol-grip or power-operated grease guns, as an example.

Figure 6A:
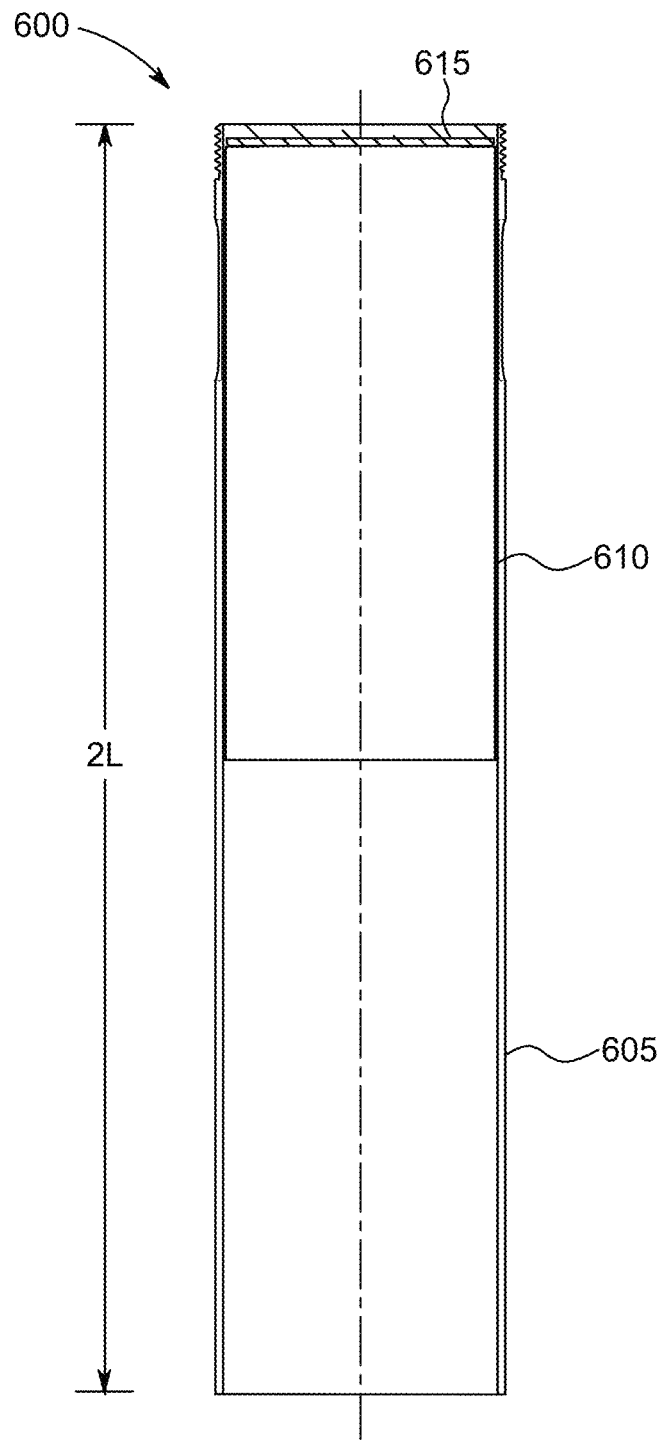
FIGS. 6A-6C depict sectional views (section A-A) of yet another example fluid reservoir in accordance with the present disclosure.
Figure 6B:
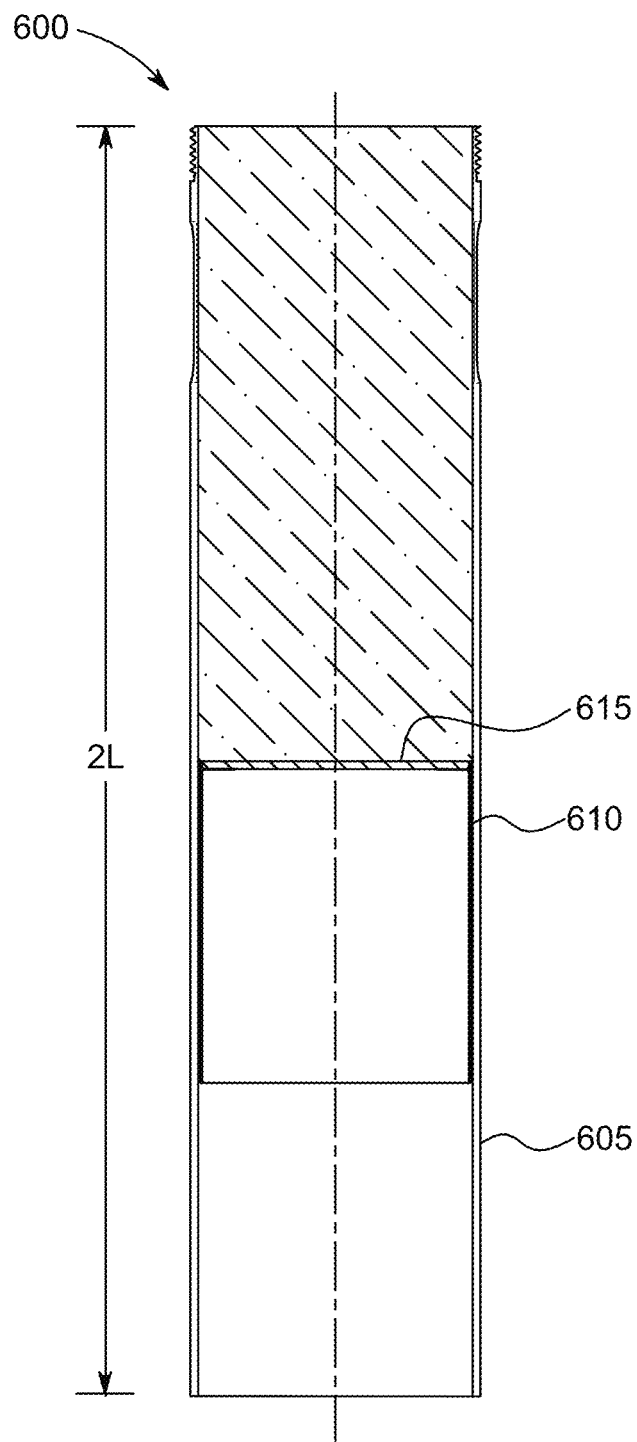
Figure 6C:
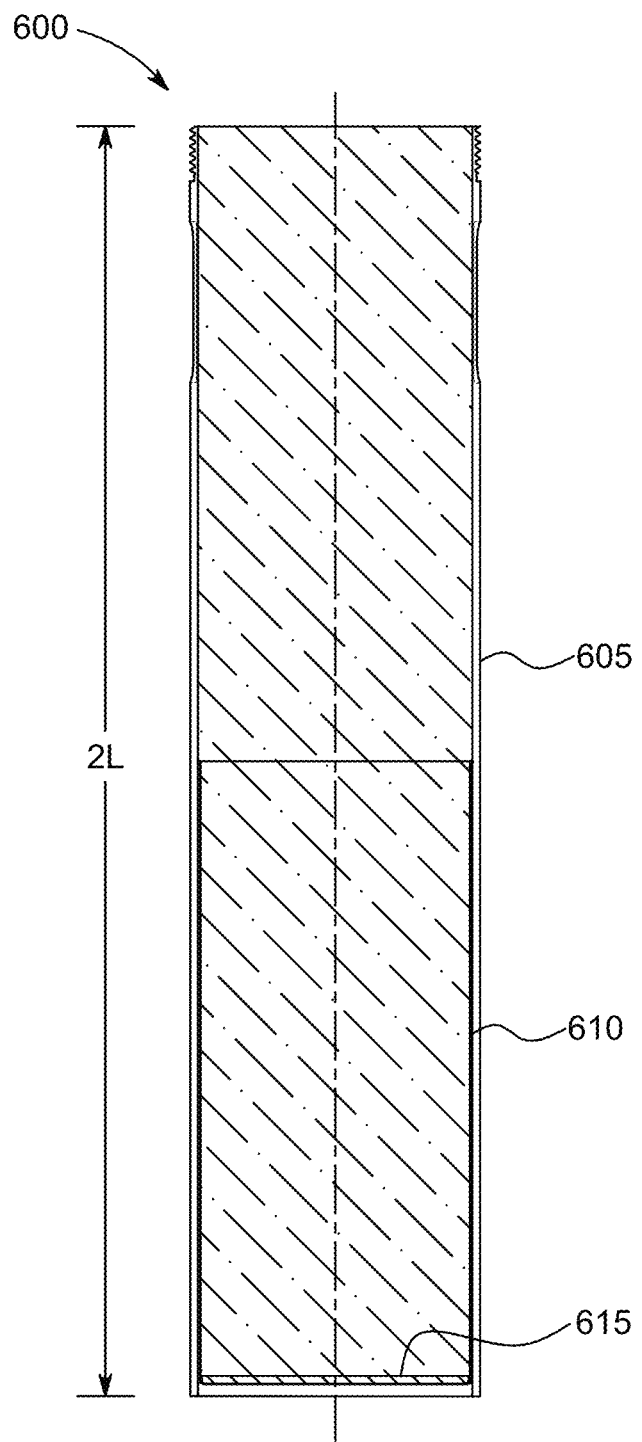

FIGS. 6A-6C depict sectional view (section A-A) of yet another example fluid reservoir 600 in accordance with the present disclosure. While describing FIGS. 6A-6C, references may be made to FIG. 6D that depicts an exterior view of the fluid reservoir 600. The fluid reservoir 600 may be similar to the fluid reservoir 100. FIG. 6A depicts sectional view of an empty fluid reservoir 600, FIG. 6B depicts sectional view of the fluid reservoir 600 that may be half-filled, and FIG. 6C depicts sectional view of the fluid reservoir 600 that may be completely filled.

The fluid reservoir 600 may include a fluid reservoir outer body 605, and a fluid reservoir inner body 610 disposed inside the fluid reservoir outer body 605. The fluid reservoir inner body 610 may include a flexible sidewall and a closed end 615. The closed end 615 may be a rigid end.

The fluid reservoir outer body 605 may be same as the fluid reservoir outer body 130, the fluid reservoir inner body 610 may be same as the fluid reservoir inner body 135, the flexible sidewall may be same as the flexible sidewall described above, and the closed end 615 may be same as the closed end 140. The fluid reservoir outer body 605 may be a rigid body and the fluid reservoir inner body 610 may be a flexible thin body. The fluid reservoir outer body 605 and the fluid reservoir inner body 610 may be molded to form a single unified piece or single piece fluid reservoir and may be made of plastic.

The flexible sidewall may have the length "2L". In some aspects, a fluid reservoir outer body 605 length may be double the fluid reservoir outer body 130 length. Stated another way, the fluid reservoir 600 outer body length may be "2L", such that the fluid reservoir 600 outer body may completely enclose the flexible sidewall when the flexible sidewall wall may completely expand (e.g., when the fluid reservoir 600 may be completely filled with grease). This fluid reservoir 600 structure may provide ease of "gripping"

to the user, especially if the user uses the fluid reservoir 600 as the second (or opposite) lever on a lever grease gun.

The fluid reservoir inner body 610 may be configured to expand or contract when grease may be filled in or dispensed from the fluid reservoir 600. Specifically, the fluid reservoir inner body 610 (e.g., the flexible sidewall) may be configured to unfold or fold onto itself when grease may be filled in or dispensed from the fluid reservoir 600, as described above. For example, when the fluid reservoir 600 may be empty, the flexible sidewall may fold onto itself and may have effective length equivalent to length "L", as shown in FIG. 6A. In this case, the closed end 615 may be located in proximity to the fluid reservoir 600 top end.

When the grease may be filling inside the fluid reservoir 600 (i.e., inside the fluid reservoir inner body 610), the closed end 615 may move downwards due to grease volume (e.g., the closed end 615 may move from the fluid reservoir 600 top end towards the fluid reservoir 600 bottom end), and the flexible sidewall may start to unfold and expand. When the fluid reservoir 600 may be half-filled with grease, the closed end 615 may be positioned in proximity to fluid reservoir 600 middle portion, as shown in FIG. 6B. In this case, a flexible sidewall length (e.g., effective sidewall length) may be "1.5L".

When more grease may be filled inside the fluid reservoir 600, the flexible sidewall may continue to unfold till the closed end 615 moves in proximity to the fluid reservoir 600 bottom end, as shown in FIG. 6C. At this position, the flexible sidewall may expand completely, and the effective flexible sidewall length may be equivalent to the fluid reservoir outer body 605 length (e.g., length "2L").

Similarly, the fluid reservoir inner body 610 may be configured to collapse or contract when the grease may be dispensed from the fluid reservoir 600. Specifically, the closed end 615 may start to move upwards from the fluid reservoir 600 bottom end towards the fluid reservoir 600 top end, when the grease may be dispensed from the fluid reservoir 600. In this case, the flexible sidewall may start to fold back again onto itself when the closed end 615 moves from the fluid reservoir 600 bottom end towards the fluid reservoir 600 top end.

For example, when the operator dispenses 50% grease from the fluid reservoir 600, the closed end 615 may be located in proximity in the fluid reservoir 600 middle portion. The closed end 615 may continue to move upwards when more grease may be dispensed from the fluid reservoir 600, till the closed end 615 may be in proximity to the fluid reservoir 600 top end. The fluid reservoir 600 may be completely empty when the closed end 615 may be in proximity to the fluid reservoir 600 top end.

Figure 6D:
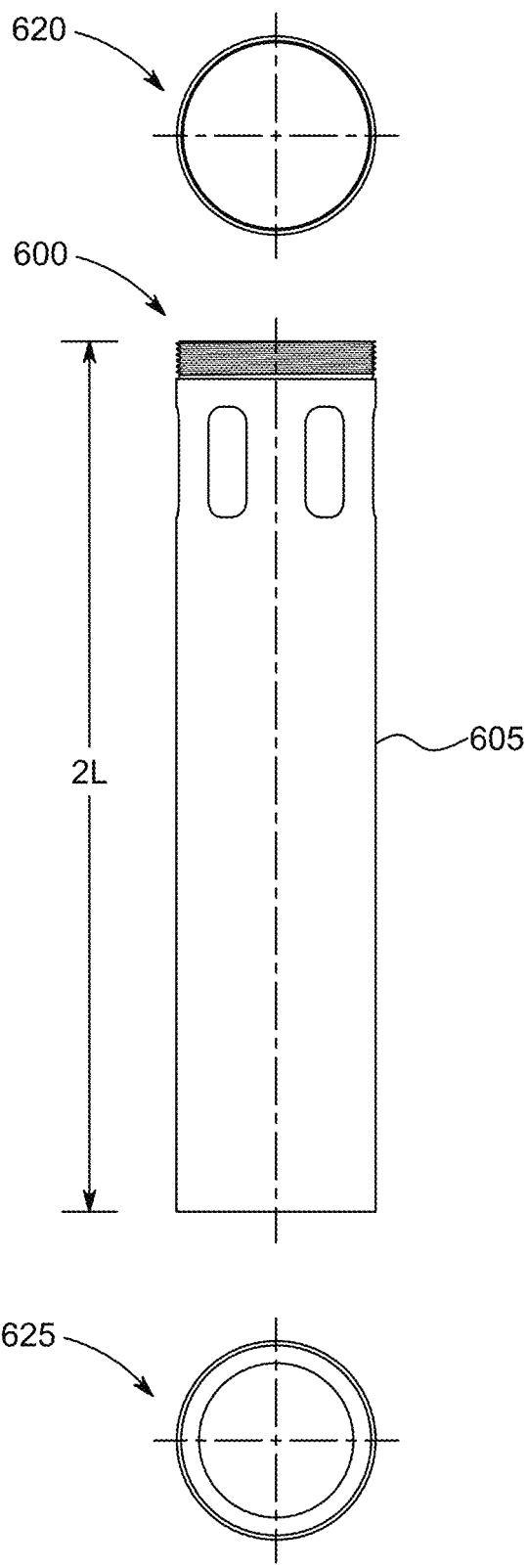
FIG. 6D depicts an exterior view of the fluid reservoir of FIGS. 6A-6C in accordance with the present disclosure.

The fluid reservoir outer body 605 (as shown in FIG. 6D) may be made of transparent or translucent material, e.g., plastic. The fluid reservoir inner body 610 too may be made of transparent or translucent material, e.g., plastic. In this manner, the user may easily view the amount of grease left in or dispensed from the fluid reservoir 600, as described above. Top and bottom views of the fluid reservoir 600 are shown as views 620 and 625 in FIG. 6D. Diameters of fluid reservoir outer body 605 and the fluid reservoir inner body 610 may be same as diameters of the fluid reservoir outer body 130 and the fluid reservoir inner body 135 respectively.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A fluid reservoir configured to attach to a pump head, the fluid reservoir comprising:
   an attachment configured to engage with a pump head socket, where the attachment comprises threads at an attachment outer surface portion;

a fluid reservoir outer body having an interior surface and an exterior surface; and a fluid reservoir inner body disposed at the interior surface, wherein:
- the fluid reservoir inner body is configured to store fluid,
- the fluid reservoir outer body and the fluid reservoir inner body form a single piece fluid reservoir,
- the fluid reservoir inner body is configured to expand longitudinally when the fluid is filled in the fluid reservoir inner body and collapse longitudinally when the fluid is dispensed from the fluid reservoir inner body,
- the fluid reservoir inner body comprises a rigid closed end and a flexible sidewall, and
- the rigid closed end is configured to move upwards longitudinally towards the attachment when the fluid is dispensed from the fluid reservoir inner body.

2. The fluid reservoir of claim 1, wherein the fluid reservoir outer body is a rigid body and the fluid reservoir inner body is a flexible body.

3. The fluid reservoir of claim 1, wherein the fluid reservoir outer body does not expand or collapse when the fluid reservoir inner body expands or collapses.

4. The fluid reservoir of claim 1, wherein the fluid reservoir inner body is configured to expand to a length that is twice a fluid reservoir outer body length.

5. The fluid reservoir of claim 1, wherein the fluid reservoir inner body is configured to expand to a length that is equivalent to a fluid reservoir outer body length.

6. The fluid reservoir of claim 1, wherein the flexible sidewall is configured to fold onto itself when the rigid closed end moves upwards.

7. The fluid reservoir of claim 1, wherein the fluid reservoir inner body comprises circular cross-section, and wherein a rigid closed end diameter is equivalent to a fluid reservoir inner body diameter.

8. The fluid reservoir of claim 1, wherein the fluid reservoir outer body and the fluid reservoir inner body are made of plastic.

9. A fluid reservoir configured to attach to a pump head, the fluid reservoir comprising:
- an attachment configured to engage with a pump head socket, where the attachment comprises threads at an attachment outer surface portion;
- a fluid reservoir outer body having an interior surface and an exterior surface; and
- a fluid reservoir inner body disposed at the interior surface, wherein:
  - the fluid reservoir inner body is configured to store fluid,
  - the fluid reservoir outer body and the fluid reservoir inner body form a single piece fluid reservoir,
  - the fluid reservoir inner body comprises a rigid closed end and a flexible sidewall,
  - the flexible sidewall is configured to fold onto itself when the fluid is dispensed from the fluid reservoir inner body, and
  - the rigid closed end is configured to move upwards longitudinally towards the attachment when the fluid is dispensed from the fluid reservoir inner body.

10. The fluid reservoir of claim 9, wherein the flexible sidewall is configured to expand longitudinally when the fluid is filled in the fluid reservoir inner body.

11. The fluid reservoir of claim 10, wherein the flexible sidewall is configured to expand to a length that is twice a fluid reservoir outer body length.

12. The fluid reservoir of claim 10, wherein the flexible sidewall is configured to expand to a length that is equivalent to a fluid reservoir outer body length.

13. The fluid reservoir of claim 10, wherein the fluid reservoir outer body does not expand or collapse when the flexible sidewall expands or folds.

14. The fluid reservoir of claim 9, wherein the fluid reservoir outer body is a rigid body.

15. A fluid reservoir configured to attach to a pump head, the fluid reservoir comprising:
- an attachment configured to engage with a pump head socket, where the attachment comprises threads at an attachment outer surface portion;
- a fluid reservoir outer body having an interior surface and an exterior surface; and
- a fluid reservoir inner body disposed at the interior surface, wherein:
  - the fluid reservoir inner body is configured to store fluid,
  - the fluid reservoir outer body and the fluid reservoir inner body form a single piece fluid reservoir,
  - the fluid reservoir inner body is configured to expand longitudinally when the fluid is filled in the fluid reservoir inner body and collapse longitudinally when the fluid is dispensed from the fluid reservoir inner body,
  - the fluid reservoir inner body is configured to expand to a length that is twice a fluid reservoir outer body length,
  - the fluid reservoir inner body comprises a rigid closed end and a flexible sidewall, and
  - the rigid closed end is configured to move upwards longitudinally towards the attachment when the fluid is dispensed from the fluid reservoir inner body.

16. The fluid reservoir of claim 15, wherein the fluid reservoir outer body is a rigid body and the fluid reservoir inner body is a flexible body.

\* \* \* \* \*